US012811755B2

(12) United States Patent
Bacon et al.

(10) Patent No.: US 12,811,755 B2
(45) Date of Patent: Nov. 24, 2026

(54) DYNAMIC DETERMINATION OF MAXIMUM SENSITIVITY DEGRADATION IN A WIRELESS COMMUNICATION SYSTEM

(71) Applicant: Murata Manufacturing Co., Ltd., Nagaokakyo (JP)

(72) Inventors: Peter Bacon, Derry, NH (US); Mark Edward Magdaleno, Escondido, CA (US); Yonghuang Zeng, San Diego, CA (US); Young-Taek Lee, Gyeonggi-Do (KR)

(73) Assignee: Murata Manufacturing Co., Ltd., Nagaokakyo (JP)

(*) Notice: Subject to any disclaimer, the term of this patent is extended or adjusted under 35 U.S.C. 154(b) by 180 days.

(21) Appl. No.: 18/818,085

(22) Filed: Aug. 28, 2024

(65) Prior Publication Data

US 2024/0421966 A1 Dec. 19, 2024

Related U.S. Application Data

(63) Continuation of application No. PCT/US2023/063873, filed on Mar. 7, 2023.

(60) Provisional application No. 63/318,666, filed on Mar. 10, 2022.

(51) Int. Cl.
*H04L 5/00* (2006.01)
*H04W 28/06* (2009.01)
*H04W 28/20* (2009.01)

(52) U.S. Cl.
CPC ........... *H04L 5/0073* (2013.01); *H04W 28/06* (2013.01); *H04W 28/20* (2013.01)

(58) Field of Classification Search
CPC .... H04L 5/0073; H04W 28/06; H04W 28/20; H04B 1/1027; H04B 1/525; H04B 1/123
See application file for complete search history.

(56) References Cited

U.S. PATENT DOCUMENTS

2023/0254703 A1* 8/2023 Zhang .................... H04W 16/14 370/329
2023/0309027 A1* 9/2023 Lim ...................... H04B 1/3822
2025/0081173 A1* 3/2025 Umeda ............. H04W 72/0453

FOREIGN PATENT DOCUMENTS

WO 2020/197129 A1 10/2020
WO 2021/162461 A1 8/2021

OTHER PUBLICATIONS

International Search Report and Written Opinion for International Application No. PCT/US2023/063873 filed on Mar. 7, 2023 on behalf of Psemi Corporation Mail Date: Jun. 22, 2023 14 pages.

* cited by examiner

*Primary Examiner* — Hashim S Bhatti
(74) *Attorney, Agent, or Firm* — Steinfl + Bruno LLP

(57) ABSTRACT

Systems and methods for better utilizing available resources within a wireless telecommunication system. One aspect of the present invention is user equipment (UE) configured to autonomously determine its Maximum Sensitivity Degradation (MSD) value for a particular UE configuration. The MSD value is a function of (1) selected UE-specific parameters, such as those that are determined by the characteristics of the UE's RFFE components and RFFE architecture, and (2) selected standard parameters that may be dynamic or vary over time. Another aspect of the present invention is to configure a UE to provide its determined MSD value to a communications network, either as a raw value or as a computed indication of the MSD value relative to a specified reference value. The determined MSD value may then be used by a system controller to select a more efficient allocation of spectrum and network resources.

20 Claims, 7 Drawing Sheets

DYNAMIC DETERMINATION OF MAXIMUM SENSITIVITY DEGRADATION IN A WIRELESS COMMUNICATION SYSTEM

CROSS-REFERENCE TO RELATED APPLICATIONS

The present application is a continuation of International Application No. PCT/US2023/063873 filed on Mar. 7, 2023, which, in turn, claims priority to U.S. Provisional Application No. 63/318,666, filed on Mar. 10, 2022, for "DYNAMIC DETERMINATION OF MAXIMUM SENSITIVITY DEGRADATION IN A WIRELESS COMMUNICATION SYSTEM," the contents of all of which are incorporated herein by reference in their entirety.

TECHNICAL FIELD

This invention relates to electronic circuitry and wireless communication systems.

BACKGROUND

Modern wireless communication systems are complex systems that allow communication among a multitude of devices (such as cell phones) and base stations (directly or through intermediate access points). The base stations may control access, frequency usage, and allocation of resource blocks (blocks of sub-carrier frequencies) within a dynamic environment (e.g., cell phones moving within and across cell boundaries) while confronted by confounding factors (e.g., variable distances between radio frequency transceivers and interference from multiple sources).

Most wireless communication systems rely upon radio frequency (RF) receivers and/or transmitters. Examples include cellular telephones, personal computers, tablet computers, wireless network components, televisions, cable system "set top" boxes, automobile communication systems, wireless sensing devices, "Internet of Things" devices, and radar systems. Many RF communication systems are based on transceivers capable of transmitting and receiving in duplex or half-duplex modes across multiple frequencies in multiple bands; for instance, in the United States, the 2.4 GHz cellular band is divided into 14 channels or resource blocks spaced about 5 MHz apart. As another example, a modern "smart telephone" may include RF transceiver circuitry capable of concurrently operating on different cellular communications systems (e.g., GSM, CDMA, LTE, and 5G in multiple bands within the 600-6000 MHz range), on different wireless network frequencies and protocols (e.g., various IEEE 802.11 "WiFi" protocols at 2.4 GHz and 5 GHz), and on "personal" area networks (e.g., Bluetooth based systems).

A time division duplex (TDD) radio system operates in a single RF band and frequently switches between transmitting or receiving RF signals in the single band. An RF band typically spans a range of frequencies (e.g., 10 to 100 MHz per band), and actual signal transmission and reception may be in sub-bands of such bands, which may overlap. Alternatively, two widely spaced RF bands may be used for TDD signal transmission and reception, respectively. Time-division duplexing is particularly flexible when there is asymmetry for the uplink (UL) and downlink (DL) data rates or utilization. For example, as the amount of uplink or downlink data increases, more communication capacity can be dynamically allocated by a system controller, and as the traffic load becomes lighter, capacity can be taken away.

For some applications, international standards bodies have labeled common frequency bands with labels. For instance, bands covered by the 4G LTE (for "4th Generation, Long Term Evolution") standard are commonly labeled a "B #" (e.g., B1, B3, B7); one listing of such bands may be found at en.wikipedia.org/wiki/UMTS_frequency_bands. As another example, bands covered by the 5G NR (for "5th Generation, New Radio") technology standard for broadband cellular networks are commonly labeled as "n #" (e.g., n1, n3, n97); see, for instance, the listing at en.wikipedia.org/wiki/5G_NR_frequency_bands.

As an example of wireless RF system usage, FIG. 1 illustrates an exemplary prior art wireless communication environment 100 comprising different wireless communication systems 102 and 104 and which may include one or more mobile wireless devices 106. A wireless device 106 may be a cellular phone, a wireless-enabled computer or tablet, or some other wireless communication unit or device. A wireless device 106 may also be referred to as a mobile station, user equipment (UE), an access terminal, or some other terminology known in the industry.

A wireless device 106 may be capable of communicating with multiple wireless communication systems 102, 104 using one or more of telecommunication protocols such as the protocols noted above. A wireless device 106 also may be capable of communicating with one or more satellites 108, such as navigation satellites (e.g., GPS) and/or telecommunication satellites. The wireless device 106 may be equipped with multiple antennas, externally and/or internally, for operation on different frequencies and/or to provide diversity against deleterious path effects such as fading and multi-path interference.

The wireless communication system 102 may be, for example, a CDMA-based system that includes one or more base station transceivers (BSTs) 110 and at least one switching center (SC) 112. Each BST 110 provides over-the-air RF communication for wireless devices 106 within its coverage area. The SC 112 couples to one or more BSTs 110 in the wireless system 102 and provides coordination and control for those BSTs 110.

The communication wireless system 104 may be, for example, a TDMA-based system that includes one or more transceiver nodes 114 and a network center (NC) 116. Each transceiver node 114 provides over-the-air RF communication for wireless devices 106 within its coverage area. The NC 116 couples to one or more transceiver nodes 114 in the wireless system 104 and provides coordination and control for those transceiver nodes 114.

In general, each BST 110 and transceiver node 114 is a fixed station that provides communication coverage for wireless devices 106, and may also be referred to as base stations or some other terminology known in the telecommunications industry. The SC 112 and the NC 116 are network entities that provide coordination and control for the base stations and may also be referred to by other terminologies known in the telecommunications industry.

Wireless telecommunication systems such as the type shown in FIG. 1 must allocate a fixed range of resources (e.g., sub-band width and number of bands) among a variable number of wireless devices 106 having disparate (and often time varying) transceiver characteristics. Accordingly, it is beneficial to the overall performance of such a system to utilize available resources more effectively, particularly for advanced communication modalities.

For example, one modality called "Carrier Aggregation" (CA) has been developed to increase bandwidth for RF radio systems, and particularly cellular telephone systems. In one version of CA known as "inter-band" mode, cellular reception or transmission may occur over multiple RF bands simultaneously (e.g., RF bands B1, B3, and B7). This mode requires passing the receive or transmit RF signal through multiple band filters simultaneously, depending on the required band combination.

As another example, 5G NR Dual Connectivity (DC) is a feature that allows mobile devices to simultaneously access multiple base stations, such as a "macrocell" (high-powered cellular radio access nodes) and a "small cell" (lower-powered cellular radio access nodes), each utilizing a different frequency band, such as mid-band (1 GHz-6 GHZ) and Frequency Range 2 (FR2) mmWave frequencies, to provide improved network coverage and increased data rate. Dual Connectivity allows mobile operators to combine two or more carriers, in different bands, into a single data channel. 5G Dual connectivity using mmWave and sub-6 GHz frequencies is critical to delivering multi-Gigabit speeds and the massive capacity required for a new generation of consumer and enterprise applications. Combining different types of radio spectrum will enable mobile 5G devices to wirelessly achieve wired broadband-class speeds, even in challenging conditions such as crowded venues, in addition to powering robust 5G fixed wireless access services in homes and small businesses.

Many of these advanced cellular telephone system features would benefit from better utilization of resources.

SUMMARY

The present invention is directed to systems and methods for better utilizing available resources within a wireless telecommunication system.

One aspect of the present invention is user equipment (UE) configured to autonomously determine (e.g., periodically or upon a trigger or command), in real time, a Maximum Sensitivity Degradation (MSD) value for a particular UE configuration. The MSD value is a function of (1) selected UE-specific parameters, such as those that are determined by the characteristics of the UE's RFFE components and RFFE architecture, and (2) selected standard 3GPP parameters that may be dynamic or vary over time. Self-determination of a UE's MSD value generally may be implemented through internal changes to the programming and configuration of the UE.

Another aspect of the present invention is to configure a UE to provide its determined MSD value to a communications network, either as a raw value or as a computed indication of the MSD value relative to a specified reference value (e.g., whether the MSD value is equal to, lower than, or higher than the specified reference value). The MSD value may then be used by a system controller (e.g., a network operator) to select a more efficient allocation of spectrum and network resources. For example, if a particular UE is in a zone having low RF interference and/or the UE has low internal distortion (harmonic and/or intermodulation distortion (IMD)), then additional system resources (e.g., resource blocks) may be allocated to that UE so that more symbols per unit time (e.g., using a more advanced modulation coding scheme) can be received, thereby increasing throughput, reducing total transmission time, and thereby lowering power (e.g., battery) usage across the network (e.g., lowering power usage by lowering the active transmit time of the PA in a transmitting UE).

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

Figure 1:
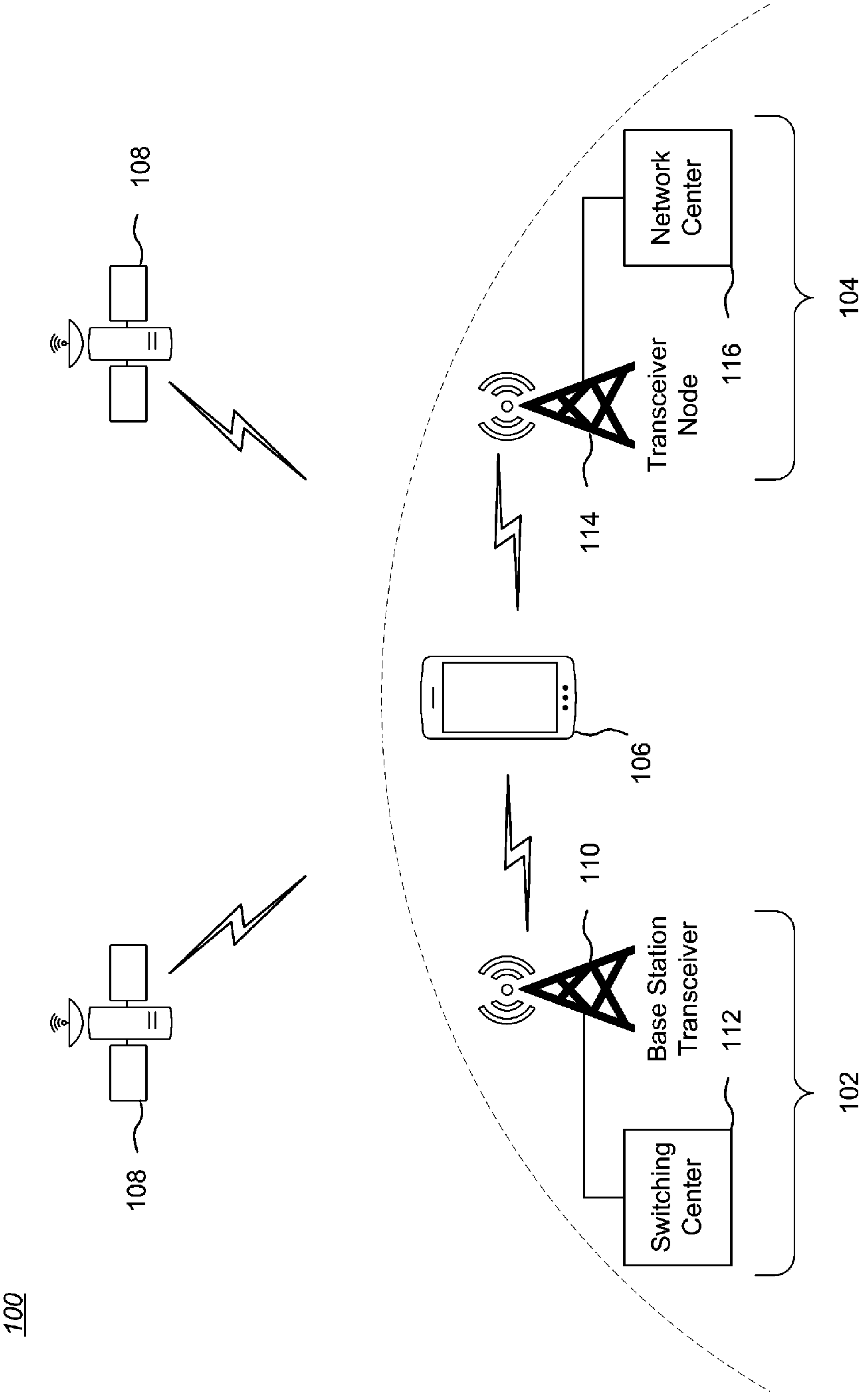
FIG. 1 (Prior Art)
FIG. 1 illustrates an exemplary prior art wireless communication environment comprising different wireless communication systems and which may include one or more mobile wireless devices.

The present invention is directed to systems and methods for better utilizing available resources within a wireless telecommunication system.

Receiver Sensitivity

Different user equipment (UE) models (including variations of a model incorporating components from different sources) may exhibit different receiver sensitivity. Receiver sensitivity determines the minimum detectable signal that can be reliably detected by the receiver circuitry and is a key factor in any communication link design. Current 3GPP-defined wireless telecommunication systems allocate resources to UEs based upon static values of the sensitivity of the receiver portion of the UE's RF front-end (RFFE) circuitry. In particular, for a UE (e.g., a cellphone handset), the current 3GPP specification defines a set of Maximum Sensitivity Degradation (MSD) values that represent the allowed amount of receiver sensitivity degradation (relative to a reference sensitivity) for various RF band combinations in certain types of communication modalities, including carrier aggregation (CA) and Dual Connectivity uplink/downlink (DC UL/DL) modalities. Sensitivity degradation depends on a number of factors, including the specific UL/DL band combinations in use, RFFE component power levels, RFFE architecture, noise levels, isolation/rejection levels, etc.

For example, as the level of receiver noise floor increases, the sensitivity degrades. This, in turn, causes loss of cell coverage and revenues. The factors contributing to the increase in noise power divide into two groups, external and internal. The external factors include, but are not limited to, intra-network and/or inter-network co-channel and adjacent-channel interference. The internal factors include, but are not limited to, the noise generated by various components within the RFFE, including the noise generated by amplifiers in the form of intermodulation distortion (IMD) products.

Ambient thermal noise, kTB, is the major external source noise into a receiver and its level directly affects the calculation of the receiver sensitivity. Addition of any noise power of any origin to this level increases the noise floor of the receiver. Ambient thermal noise is dependent upon the channel bandwidth. Bandwidth is an internal receiver setting that works with the kTB level to define the receiver's thermal noise level. Accordingly, a network can control and limit bandwidth to improve a receiver's sensitivity and range.

Other external noise sources are external intermodulation distortion-either generated in transmitters or in passive components such as antennas and connectors—and co-channel or adjacent-channel interference from other cells or cell sectors within a telecommunications network or across a network boundary.

Internal noise is often dominated by thermal noise generated within the receiver and is represented as a noise factor (linear) or noise figure (dB). Harmonic distortion and intermodulation distortion within the RFFE circuitry are other additional sources of internal noise. For example, nonlinear devices such as amplifiers create harmonics and/or IMD that raise the effective noise floor. The input level of received signals (desired signals and/or blocking signals) as well as the equivalent nth order Intercept Point (IPn) of the receiver, determine the level of the harmonics and intermodulation distortion created by the presence of the received signals. The effects of non-linearity of mixers, amplifiers, switches, and other RFFE components are captured by the concept of intermodulation distortion (IMD), which is related to nth order Intercept Points. For example, the $2^{nd}$ order Intercept Point (IP2) is a measure of linearity that quantifies the second-order distortion generated by nonlinear systems and devices, such as amplifiers and mixers. IP2 is related to the $3^{rd}$ order Intercept Point (IP3), which is generally used for quantifying the degree of non-linearity of a nonlinear system. To determine the IP2 characteristics of a device, an input signal $S_{IN}$ composed of two strong tones, A and B, may be put through the device under test (DUT), and the output $S_{OUT}$ is then measured. In simplified form, if an input signal Six to a device under test (DUT) equals cos(A)+cos(B) (i.e., tones having equal amplitudes), then the output Sour will be a function of $S_{IN}$=cos(A)+cos(B) and of $S_{IN}^2$=1+cos(2A)/2+cos(2B)/2+cos(A+B)+cos(A−B). The first two cosine terms for $S_{IN}^2$ represent harmonic components, while the second two cosine terms represent second-order intermodulation distortion (IMD2) components.

Figure 2:
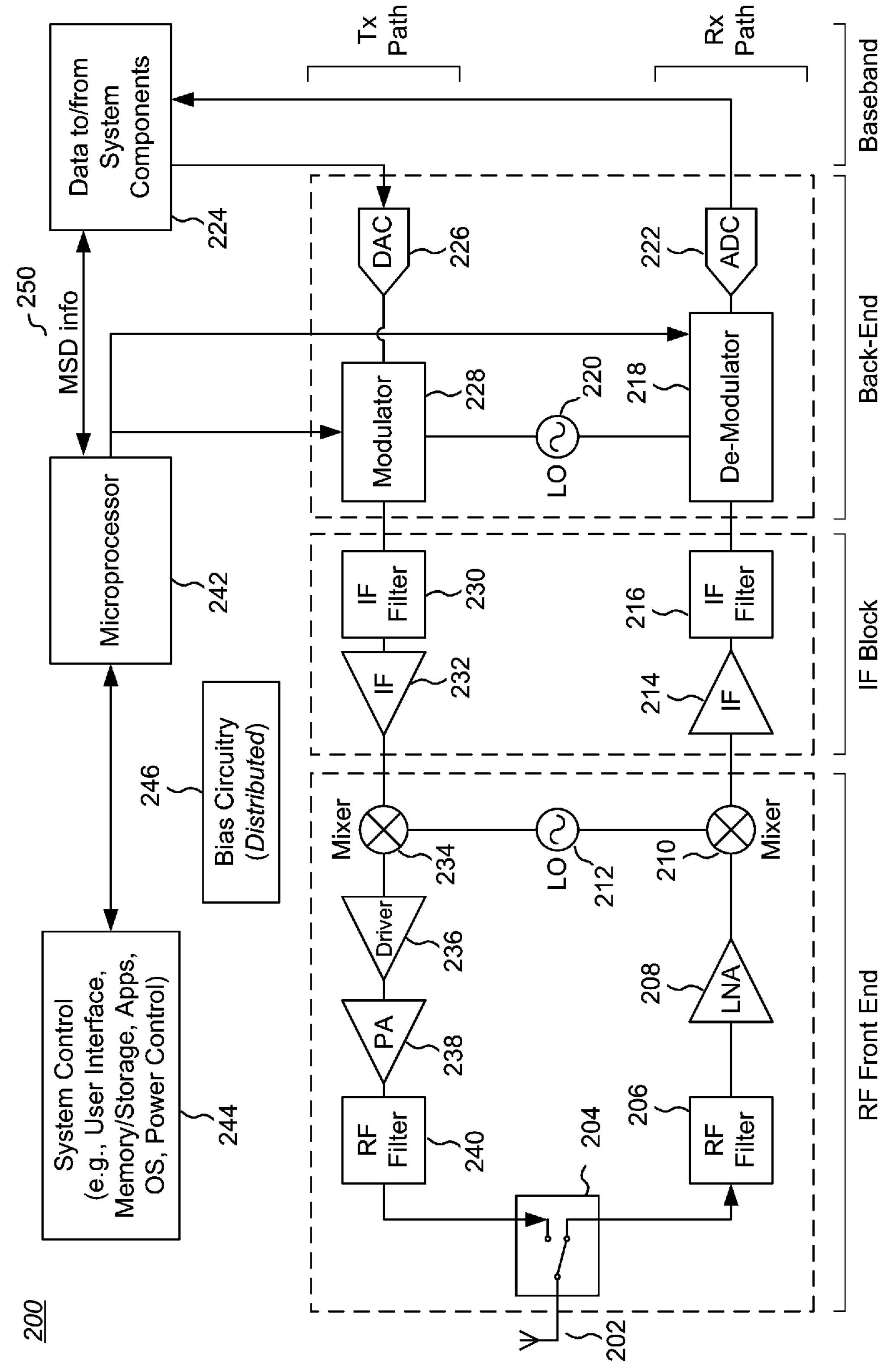
FIG. 2 is a block diagram of a transceiver that might be used in a wireless device, such as a cellular telephone, and which may beneficially incorporate an embodiment of the present invention for improved performance of a cellular network.

To better understand the possible sources for internal noise in a receiver, it is useful to review the architecture of a typical transceiver. FIG. 2 is a block diagram of a transceiver 200 that might be used in a wireless device, such as a cellular telephone, and which may beneficially incorporate an embodiment of the present invention for improved performance of a communication network. As illustrated, the transceiver 200 includes a mix of RF analog circuitry for directly conveying and/or transforming signals on an RF signal path, non-RF analog circuitry for operational needs outside of the RF signal path (e.g., for bias voltages and switching signals), and digital circuitry for control and user interface requirements and for baseband processing. In this example, a receiver path Rx includes RF Front End, Intermediate Frequency (IF) Block, Back-End, and Baseband sections (noting that in some implementations, the differentiation between sections may differ).

The receiver path Rx receives over-the-air RF signals through at least one antenna 202 and a switching unit 204, which may be implemented with active switching devices (e.g., field effect transistors or FETs) and/or with passive devices that implement frequency-domain multiplexing, such as a diplexer or duplexer. An RF filter 206 passes desired received RF signals to at least one low noise amplifier (LNA) 208, the output of which is combined in a corresponding mixer 210 with the output of a first local oscillator 212 to produce an IF signal. The IF signal may be amplified by an IF amplifier 214 and subjected to an IF filter 216 before being applied to a demodulator 218, which may be coupled to a second local oscillator 220. The demodulated output of the demodulator 218 is transformed to a digital signal by an analog-to-digital converter 222 and provided to one or more system components 224 (e.g., a video graphics circuit, a sound circuit, memory devices, etc.). The converted digital signal may represent, for example, data, video or still images, sounds, or symbols, such as text or other characters.

In the illustrated example, a transmitter path Tx includes Baseband, Back-End, IF Block, and RF Front End sections (again, in some implementations, the differentiation between sections may differ). Digital data from one or more system components 224 is transformed to an analog signal by a digital-to-analog converter 226, the output of which is applied to a modulator 228, which also may be coupled to the second local oscillator 220. The modulated output of the modulator 228 may be subjected to an IF filter 230 before being amplified by an IF amplifier 232. The output of the IF amplifier 232 is then combined in a mixer 234 with the output of the first local oscillator 212 to produce an RF signal. The RF signal may be amplified by a driver 236, the output of which is applied to a power amplifier (PA) 238. The amplified RF signal may be coupled to an RF filter 240, the output of which is coupled to at least one antenna 202 through the switching unit 204.

The operation of the transceiver 200 is controlled by a microprocessor 242 in known fashion, which interacts with system control components 244 (e.g., user interfaces, memory/storage devices, application programs, operating system software, power control, etc.). In addition, the transceiver 200 will generally include other circuitry, such as bias circuitry 246 (which may be distributed throughout the transceiver 200 in proximity to transistor devices), electrostatic discharge (ESD) protection circuits, testing circuits (not shown), factory programming interfaces (not shown), etc.

As noted above, in modern transceivers, there are often more than one receiver path Rx and more than one transmitter path Tx, for example, to accommodate multiple frequency bands and/or signaling modalities. Further, as should be apparent to one of ordinary skill in the art, some components of the transceiver 200 may be positioned in a different order (e.g., filters) or even omitted. Other components can be (and often are) added, such as (by way of example only) additional filters, impedance matching networks, variable phase shifters/attenuators, power dividers, etc.

As should be readily apparent, the RFFE of the receiver path Rx of the transceiver 200 includes at least one amplifier 208 and corresponding mixer 210, all of which may be sources of harmonic distortion and IMD. Further, the RFFE of the transmitter path Tx is in close proximity to the receiver path Rx, which may result in self-interfering signals within the transceiver 200.

Radio Interference Aggressors and Victims

Radio frequency interference may also be thought of in terms of "Aggressors" (strong transmission Tx signals) and "Victims" (frequency ranges affected by IMD caused by the presence of Aggressors). Aggressors and generally refer to actual signals and their respective center frequency and bandwidth rather than to a receiver/transmitter path. Nothing about a transmitter or receiver changes in relation to the resources allocated-rather the signal characteristics change (e.g., modulation, bandwidth, and/or RB allocation).

Figure 3:
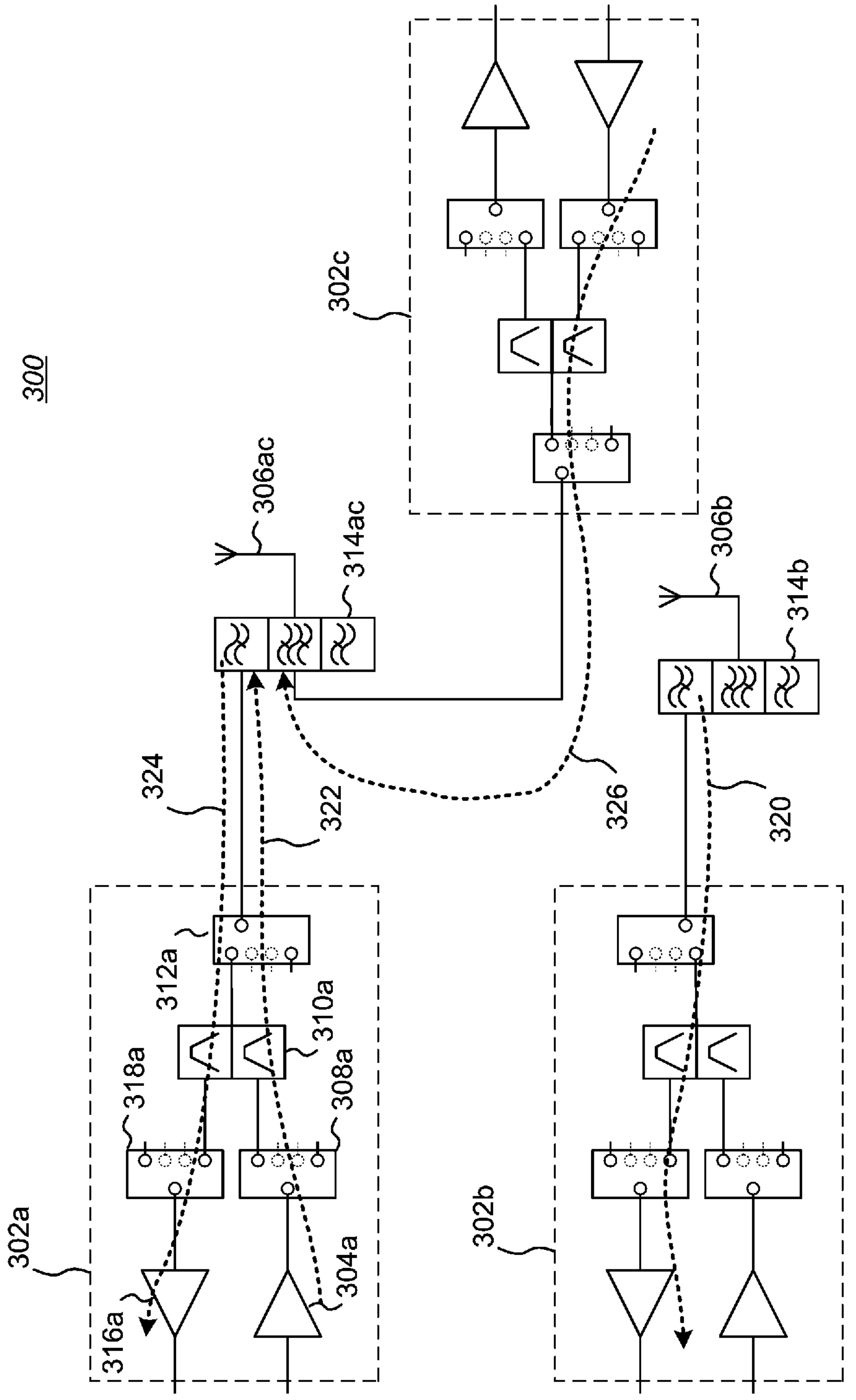
FIG. 3 is a block diagram of three transceivers within the same UE, tuned for different frequency bands.

For example, FIG. 3 is a block diagram 300 of three transceivers 302*a*, 302*b*, 302*c* within the same UE, designed and tuned for different frequency bands. In the illustrated example, the transceiver architectures are essentially identical (but tuned differently) and include a number of components (to avoid clutter, only the components within transceiver 302*a* are labeled). For example, transceiver 302*a* includes a transmit path that comprises a power amplifier 304*a* coupled to an antenna 306*a* through a transmit switch 308*a*, a duplexer 310*a*, an antenna switch 312*ac*, and a triplexer 314*ac*. The transceiver 302*a* also includes a receive path that comprises a low-noise amplifier 316*a* coupled to the antenna 306*ac* through a receive switch 318*a*, the duplexer 310*a*, the antenna switch 312*a*, and the triplexer 314*ac*. In the illustrated example, transceiver 302*c* shares a common triplexer 314*ac* and antenna 306*ac*, while transceiver 302*b* has its own triplexer 314*b* and antenna 306*b*.

Signal flow arrows in FIG. 3 indicate some possible RF signals concurrently traversing the transceivers 302*a*, 302*b*, 302*c*. For example, transceiver 302*b* may be receiving a signal 320 from antenna 306*b*, transceiver 302*a* may be both transmitting a signal 322 to antenna 306*ac* and receiving a signal 324 from antenna 306*ac*, and transceiver 302*c* may be transmitting a signal 326 to antenna 306*ac*. The relatively strong transmit signals 322 and 326 from transceiver 302*a* and transceiver 302*c* are considered Aggressors, while the receiver signals 324 and 320 within transceivers 302*a* and 302*b* are potential Victims.

Figure 4:
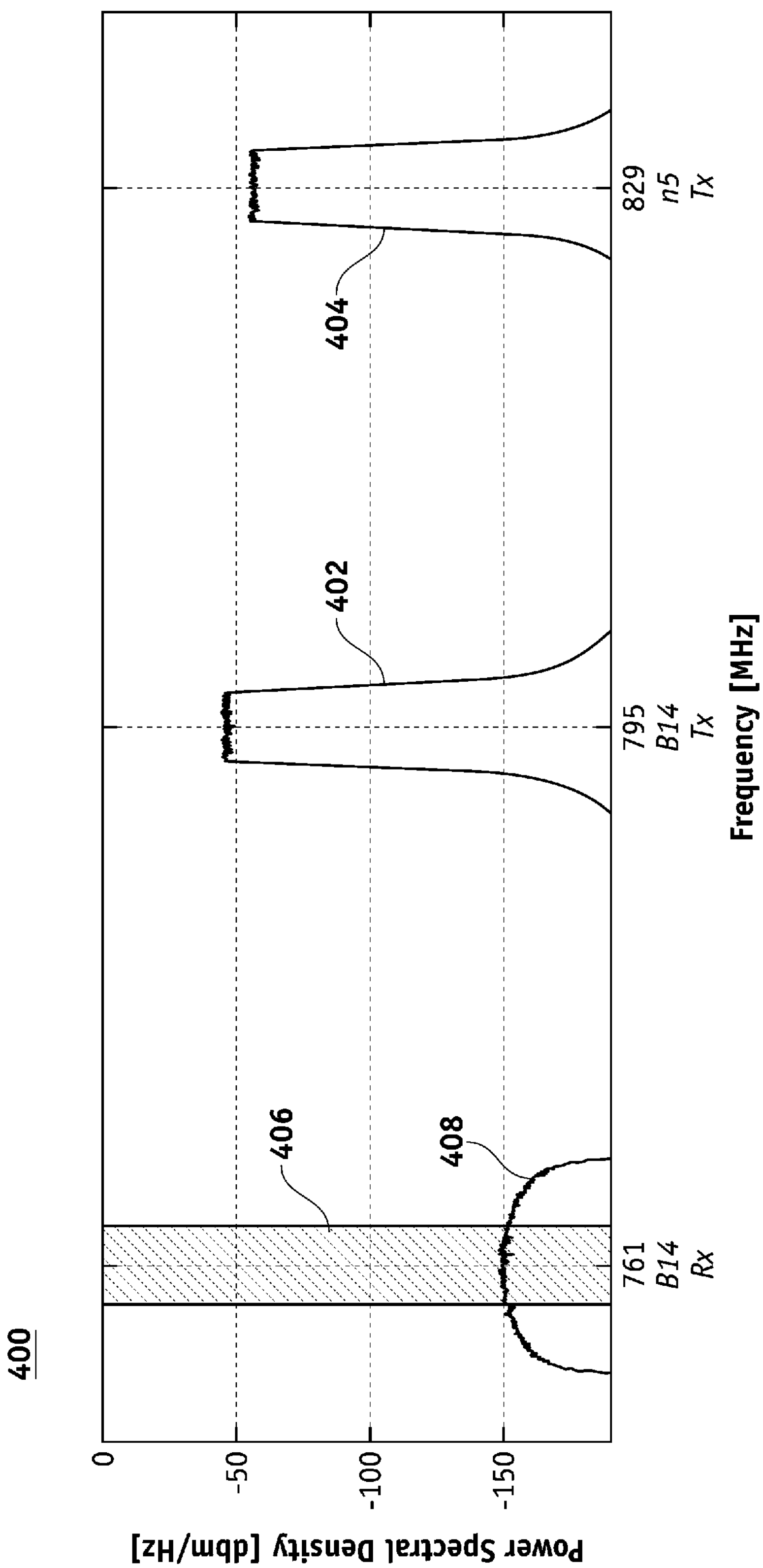
FIG. 4 is a graph showing the power spectral density (PSD) versus frequency for two transmitting Aggressor bands, and the frequency span of a receiving Victim band.

As an example of IMD effects, FIG. 4 is a graph 400 showing the power spectral density (PSD) versus frequency for two Aggressor signals transmitted over their respective frequency bands, and the frequency span of a receiving Victim band. More specifically, graph line 402 shows the PSD for transmission (UL) over band B14 and graph line 404 shows the PSD for transmission (UL) over band n5. Region 406 shows the frequency span of receiving (DL) band B14. Of note, graph line 408 shows the PSD of IMD generated by the two UL transmissions. It is desirable that the magnitude of the IMD be low (more negative).

The non-linearities of each of the components within a transceiver may be a contributor to Aggressor-generated IMD, but generally there are only one or a few components having dominant contributions to a specific IMD case. For example, TABLE 1 below shows contributions to third-order IMD of one modeled circuit of the components of transceivers for bands n5 and B14 (more negative levels are better, less negative levels are worse). The strong signal Aggressors are the n5 and B14 UL signals. The Victim band is the B14 DL. In this example, the antenna switch and the low-noise amplifier of the B14 transceiver generate the dominant contributions to the third-order IMD (FIG. 4, graph line 408) that overlaps B14 DL (FIG. 4, graph line 406), as indicated by the bolded values.

TABLE 1

(all values are in dBm)

| Victim Band Component | n5 transceiver | B14 transceiver |
|---|---|---|
| power amplifier | −187.8 | −102.0 |
| transmit switch | −232.3 | −147.8 |
| duplexer | −125.3 | −99.1 |
| antenna switch | −108.8 | **−83.3** |
| triplexer | −121.9 | −102.0 |
| receive switch | −288.1 | −203.7 |
| low-noise amplifier | −498.4 | **−93.7** |

It should be noted that there are different orders of intermodulation distortion (e.g., IMD3, IMD4, IMD7, denoting third, fourth, and seventh orders). For a simple case involving two strong Aggressors ($f_1$, $f_2$), each IMD order will have multiple center frequencies of IMD products according to the following expression:

$$f_{IMD} = \pm m * f_1 \pm n * f_2$$

where m+n is equal to the IMD order. By example, a third order IMD will have the following products:

$$f_{IMD} = \pm 0 * f_1 \pm 3 * f_2$$
$$f_{IMD} = \pm 1 * f_1 \pm 2 * f_2$$
$$f_{IMD} = \pm 2 * f_1 \pm 1 * f_2$$
$$f_{IMD} = \pm 3 * f_1 \pm 0 * f_2$$

The likelihood of an IMD product overlapping a specific downlink (DL) may be numerically determined and may be flagged as needing assessment. TABLE 2 below shows occurrences ("x" marks) where IMD overlaps occur in the specific DL for the two UL Aggressor bandwidths. As can be seen, the IMD order causing an overlap may vary for a particular Aggressor combination, and multiple IMD orders may cause overlaps in a single DL band.

TABLE 2

(all frequency ranges in MHz)

| Aggressor Sub-Bands (UL) | | Victim Bands (DL) IMD $2^{nd}$ order through IMD $6^{th}$ order: B29 (717-728) | | | | | B12 (729-746) | | | | | B14 (758-768) | | | | | n5 (869-894) | | | | |
|---|---|---|---|---|---|---|---|---|---|---|---|---|---|---|---|---|---|---|---|---|---|
| n5 | B14 | 2 | 3 | 4 | 5 | 6 | 2 | 3 | 4 | 5 | 6 | 2 | 3 | 4 | 5 | 6 | 2 | 3 | 4 | 5 | 6 |
| (824-829) | (788-793) | | | | x | | | | | x | | | x | | | | | x | | x | |
| (829-834) | (788-793) | | | | x | | | x | | | | | | | | | | x | | | |
| (834-839) | (788-793) | | | | | | | x | | | | | | | | | | x | | | |
| (839-844) | (788-793) | | | | | | | x | | | | | | | | | | x | | | |
| (844-849) | (788-793) | | x | | | | | x | | | | | | | | | | | | | |
| (824-829) | (793-798) | | | | x | | | | | x | | | x | | | | | | | x | |
| (829-834) | (793-798) | | | | x | | | | | x | | | x | | | | | x | | x | |
| (834-839) | (793-798) | | | | x | | | | | | | | x | | | | | x | | | |
| (839-844) | (793-798) | | | | | | | x | | | | | | | | | | x | | | |
| (844-849) | (793-798) | | | | | | | x | | | | | | | | | | x | | | |

Maximum Sensitivity Degradation

To quantify the degradation of a receiver's sensitivity due to self-interference ("desense") conditions, such as depicted in FIG. 3, a metric referred to as Maximum Sensitivity Degradation (MSD) is used. MSD is a simple ratio of the effective receiver sensitivity under the desense conditions versus the reference sensitivity that is bandwidth and receiver parameter dependent (NF, Gain, etc.). The current 3GPP standard specifies static MSD values (e.g., for certain band combinations) for use by network control systems in selecting band combinations and making resource allocation decisions for the UEs. These static MSD specifications are typically based on conservative evaluations of RFFE component characteristics so that the standard can be met by a broad range of UE architectures and suppliers. In addition, the 3GPP-specified MSD levels are determined for cell edge conditions where the range is maximized by minimizing the required signal-to-noise requirements of the modulation scheme (QPSK is used) and the maximum permissible transmit UL power is used for the specified power class.

It has been discovered in testing of actual UEs on the market that some UEs exhibit Maximum Sensitivity Degradation values that are up to about 20 dB lower (thus better) than the 3GPP-specified MSD allowances. Accordingly, when communications networks make resource allocation decisions based on the conservative and static 3GPP MSD specifications for all UEs without differentiation regarding the actual receiver sensitivity of the individual UEs, resulting spectrum and network resource allocations may be suboptimal.

For example, TABLE 3 below shows the 3GPP static MSD specifications for two different combinations of communication bands, and measured MSD values for four different example UEs.

TABLE 3

(all values in dB)

| | 3GPP Static MSD | UE-1 | UE-2 | UE-3 | UE-4 |
|---|---|---|---|---|---|
| Band Combination 1 | **29** | 16 | 13 | 10 | 20 |
| Band Combination 2 | **29.4** | 29 | 20 | 15 | 25 |

As the table values indicate, UE-2 and UE-3 have much better (i.e., lower) measured MSD parameter values than UE-4, while UE-1 has a better measured MSD parameter value than UE-4 for band combination 1, but a worse (i.e., higher) measured MSD parameter value than UE-4 for band combination 2. Thus, if these actual MSD values were known, a communication system controller could take advantage of the resulting extra margin in the effective link budget by increasing the modulation and/or channel bandwidth to increase throughput. For example, a communication system controller could allocate more system resources (such as channel bandwidth) to any of the UEs for band combination 1, and to 3 of 4 of the UEs for band combination 2. As another example, a communication system controller could change the Modulation-Coding Scheme (MCS) to provide for higher a modulation scheme plus an increased coding rate, resulting in more data bits per packet and fewer error correction bits. Similarly, more system resources or a higher-performance MCS could be allocated to UE-2 or UE-3 relative to UE-1 or UE-4 for either band combination, to UE-1 rather than UE-4 for band combination 1 environment, and to UE-4 rather than UE-1 for band combination 2.

Rather than utilizing conservative and static MSD specifications for all UEs within a cellular system, an aspect of the present invention is the realization that spectrum and network resource allocations could be more effectively regulated by determining MSD values for individual UEs and using those MSD values to allocate system resources, thereby improving overall system efficiency.

One aspect of the present invention is a UE configured to autonomously determine (e.g., periodically or upon a trigger), in real time, an MSD value for a particular UE configuration. The MSD value is a function of (1) selected UE-specific parameters, such as those that are determined by the characteristics of the UE's RFFE components and RFFE architecture, and (2) selected standard 3GPP parameters that may be dynamic or vary over time. Self-determination of a UE's MSD value generally may be implemented through internal changes to the programming and configuration of an existing UE, since current UEs are not configured to make such a determination in the field.

Another aspect of the present invention is to configure a UE to provide its determined MSD value to the communications network, either as a raw value or as a computed indication of the MSD value relative to a specified reference value (e.g., whether the MSD value is equal to, lower than, or higher than the specified reference value). The MSD value may then be used by a system controller (e.g., a switching center 112 or network center 116) to select a more efficient allocation of spectrum and network resources. For example, if a particular UE is in a zone having low RF interference and/or the UE has low internal distortion (harmonic and/or IMD) and thus has a low MSD value, then additional system resources (e.g., resource blocks) may be allocated to that UE so that more symbols per unit time (e.g., using a more advanced modulation coding scheme) can be received, thereby increasing throughput and lowering power (e.g., battery) usage across the network (e.g., lowering power usage by lowering the active transmit time of the PA in a transmitting UE).

Yet another aspect of the present invention is to configure a UE to use its determined MSD value to adjust the values of one or more component parameters within the UE to improve UE performance.

Figure 5:
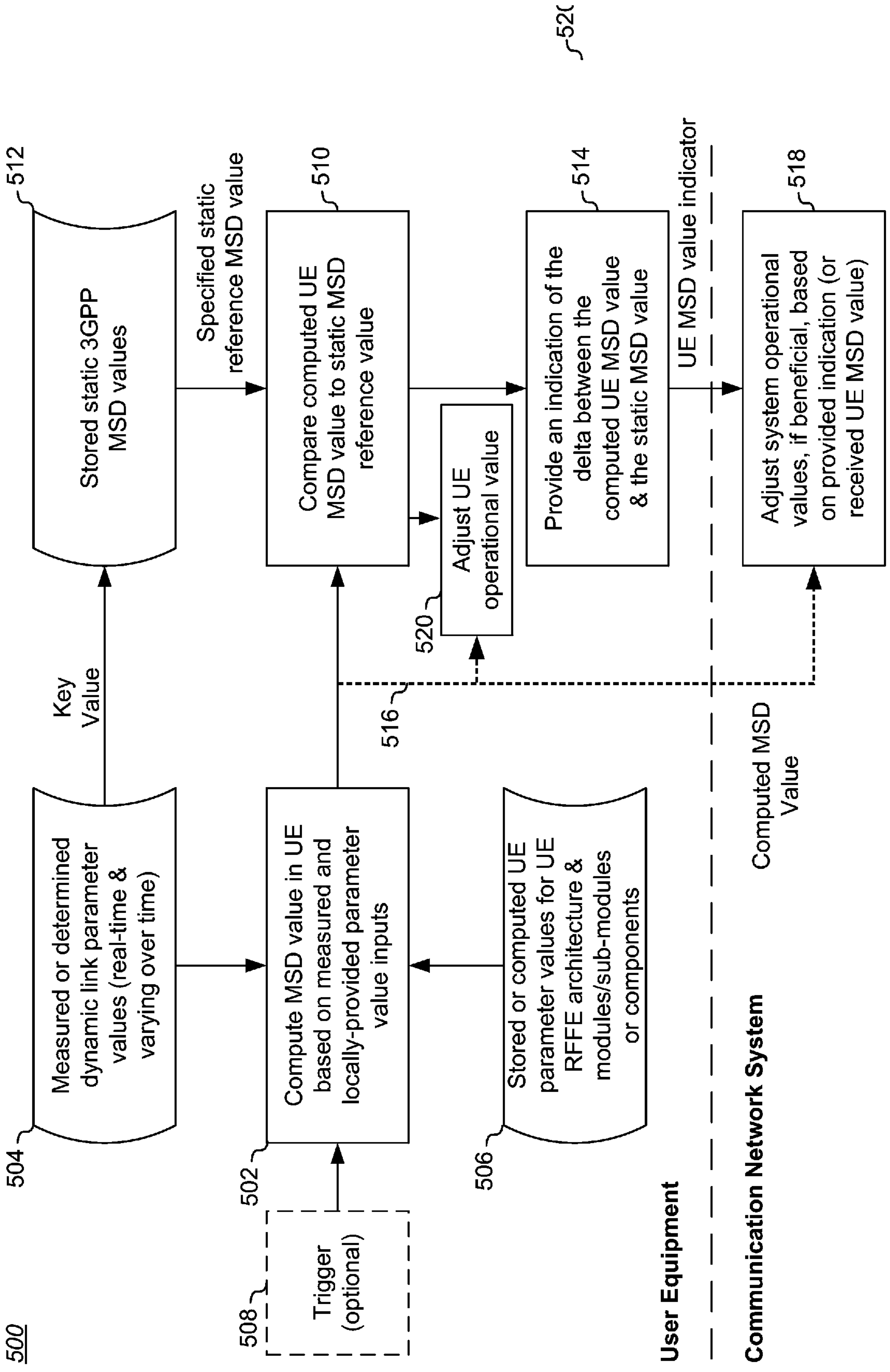
FIG. 5 is a process chart showing one method for autonomously determining an MSD value within a UE and utilizing that MSD value to adjust system operational values.

FIG. 5 is a process chart 500 showing one method for autonomously determining an MSD value within a UE and utilizing that MSD value to adjust communication system operational values. A computational process 502 calculates an MSD value for a specific UE based on inputs of measured and/or determined dynamic parameter values 504 and on locally stored or computed UE parameter values 506 (see below for details of the MSD calculation).

The measured and/or determined dynamic link parameter values 504 generally reflect characteristics of the current communications network environment (e.g., current transmit and/or receive frequency bands). The dynamic link parameter values 504 may be locally stored within the UE, such as in a look-up table (LUT) in electronic memory (e.g., RAM, NVRAM, EEPROM, EAROM, flash memory, etc.). Some or all of the dynamic link parameter values 504 may be obtained from (or allocated by) a system controller for the communications network, occasionally (e.g., upon UE startup or when moving between cells or upon a trigger event) and/or periodically. The measured instances of the dynamic link parameter values 504 generally would be locally measured within a UE. The dynamic link parameter values 504 may be measured, allocated, or determined in real time, or may be measured only occasionally (e.g., when a channel allocation changes). Examples of dynamic link parameters that vary over time include the following: allocated band combinations (e.g., bands n5 and B14), channel bandwidth, sub-carrier spacing, and resource block allocations in frequency. Examples of dynamic link parameters that may be network system operator dependent include the following: transmit and receive frequency bands, uplink/downlink band combinations, and modulation coding scheme.

The locally stored or computed UE parameter values 506 may be stored within the UE, such as in a look-up table (LUT) in electronic memory. The UE parameter values 506 generally reflect measurements or characteristics of the RFFE architecture and of individual modules and/or sub-modules or components of the UE itself. For example, for the RFFE of a UE as a whole, a corresponding set of parameter values may be determined that include, for instance: an identifier for the RFFE vendor; one or more measures of non-linear behavior for the RFFE (e.g., first, second, third, etc. intercept points, or a polynomial or other function that fits curve points on a graph of signal-out versus signal-in power levels, or any other measure of non-linear behavior); one or more measured or calculated rejection levels; and one or more measured or calculated noise levels. A similar set of parameter values may be determined for the individual modules and/or sub-modules or components of the RFFE of the UE. For example, referring to FIG. 3, such a set of parameter values may be separately determined for any or all of the power amplifier 304*x*, transmit switch 308*x*, duplexer 310*x*, antenna switch 312*x*, triplexer 314*x*, receive switch 316*x*, and/or low-noise amplifier 318*x*. In addition, the sets of parameter values at any level (i.e., RFFE architecture or individual modules and/or sub-modules or components) may be determined on a per band or sub-band basis or on a per band-combination basis, since the parameter values may be frequency dependent (for example, see TABLE 2 above).

The UE parameter values pertaining to the RFFE of a UE may be determined in any of a variety of ways, including by modeling the RFFE circuitry at a design stage, during testing of each integrated circuit (IC) embodying the RFFE, testing of samples of such an IC (rather than testing each such IC), during testing of a UE that incorporates such an IC, and/or by built-in self-test (BIST) circuitry. In some cases, the UE parameter values may be determined once and stored in a LUT or the like as static values. In some cases, the UE parameter values may be measured and stored in a LUT or the like with periodic or triggered updates (e.g., every time the UE is turned ON, or when the UE transitions between network cells, or when an MSD determination is initiated), or made available to the internal UE computational process 502 in real-time.

Autonomous calculation of an MSD value based on actual determinations or measurements of thermal noise (N) and interference (I) values (particularly based on the sum of those values: N+I, i.e., interference plus noise) that occur within a UE in the computational process 502 may be self-initiated (e.g., on a periodic basis), or may be initiated by an optional trigger function 508. The trigger function 508 may be based on one or more events. Examples of possible trigger events include a programmatic command (from within the UE or from a base station or network control center), a timer separate from the computational process 502, a sensed state transition (such as when the UE is turned ON or when the UE transitions between network cells), detected changes within the UE (e.g., antenna performance changes which may change or degrade MSD), and/or occurrence of a specified transmission or reception event (e.g., after a Receive Signal Strength Indicator measurement or receipt of the results of sending a Sounding Reference Signal). As should be clear, more than one trigger event may be included as part of the trigger function 508.

The computational process 502 may be performed in the microprocessor 242 shown in FIG. 2, with MSD information (such as real-time measurements of, for example, transmitter path Tx power levels) regarding system components 224 provided to the microprocessor 242. In some embodiments, the computational process 502 may include an inference network that may be trained on-line or off-line. In some embodiments, the computational process 502 may include one or more table lookup processes. In alternative embodiments, the computational process 502 may be performed by other circuitry or processors within a UE. In other embodiments, the computational process as a whole or in part may be performed on an edge processor networked with the UE over a wide area wireless network.

Once a UE MSD value is determined by the computational process 502, one option is to compare 510 the computed UE MSD value to a specified static reference MSD value (e.g., from the 3GPP MSD specification) corresponding to the current communications network environment (e.g., the current band combinations in use, such as the 824-829 MHz n5 UL sub-band and the 788-793 MHz B14 UL sub-band, and the 869-894 MHz n5 DL band). For example, a Key Value (e.g., a UL/DL band combination)

from the set of measured and/or determined dynamic link parameter values 504 may be used to look up one or more specified static reference MSD values to be provided to the comparison 510.

As shown in FIG. 5, the comparison 510 may be made within the UE. Some indication of the difference (delta) between the computed UE MSD and the specified reference MSD value is then provided 514 to the communication network system. For example, the outcome of the comparison may simply be the mathematical difference between a computed UE MSD value and a static reference MSD value. As another example, the outcome of the comparison may be a flag signal having values representing "higher" (e.g., computed UE MSD value >reference MSD value), "equal" (e.g., computed UE MSD value=reference MSD value), or "lower" (e.g., computed UE MSD value <reference MSD value). More simply, the outcome of the comparison may be a binary flag signal having values representing "lower" (e.g., computed UE MSD value <reference MSD value) or "not lower" (e.g., computed UE MSD value≥reference MSD value), or, alternatively, "higher" or "not higher".

Another option is to provide the computed UE MSD value directly to the communication network system (dotted line 516), which may make a comparison like that indicated in block 510 or otherwise use the computed UE MSD value as a direct input to an optimization evaluation.

Based on the provided indication or the received computed UE MSD value, the communication network system may adjust system operation values if beneficial. For example, as noted above, the communication network system may select a more efficient allocation of spectrum and network resources if the UE MSD value or indicator shows that the MSD for the UE is low, or may fall back to a less efficient but more robust mode of operation (e.g., a simpler modulation coding scheme) if the UE MSD value or indicator shows that the MSD for the UE is high.

In some embodiments, a UE may employ interference cancellation. Interference cancellation encompasses the idea that a UE, knowing what it is transmitting, can subtract some of the IMD distortion mathematically in the digital signal processor (DSP) process that generates a transmitted RF waveform, thereby reducing the UE's sensitivity degradation (i.e., increasing the UE's receiver sensitivity). The UE may utilize measured and/or determined dynamic parameter values 504 and/or locally stored or computed UE parameter values 506 to account for the level of IMD distortion that can be removed by the baseband DSP under the specific conditions, which will directly reduce the level of self-interference (desense), in some cases by as much as about 10-15 dB. The level of desense reduction may be highly dependent on the baseband/DSP processor used in the UE, the specific algorithms employed, the IMD order(s) and products, and nonlinear components that dominate, as well as the frequency band, channel bandwidth and signal parameters. Such interference cancellation improvement may be accounted for in providing an indication of the UE MSD value 514.

In some embodiments, the direct computed UE MSD value (dotted line 516) or the output of the comparison 510 may be utilized within the UE to adjust one or more UE operational values (block 520), such as RFFE parameters, to improve performance. For example, the UE may switch in local bandwidth-limiting devices (e.g., low-pass, high-pass, band-pass, band-stop, etc. filters, which may be located, for example, within one or more of the filter blocks 206, 216, 230, and 240 shown in FIG. 2) as a function of the computed UE MSD value to suppress interferences coming from an Aggressor source by essentially adjusting a filter response or filter bandwidth and thereby improve the MSD. As another example, as a function of the computed UE MSD value, the UE may adjust the values of operational parameters in order to improve UE system linearity and/or exploit a low-noise environment; for instance, the bias current and/or bias voltage to an amplifier (particularly a low noise amplifier) within the RFFE may be adjusted to increase the linearity of the amplifier, and thereby the UE, if the computed UE MSD value indicates the presence of interference from an Aggressor source.

Example Computations of MSD Value

Calculation of a "true" MSD value for a UE normally would take into account each available dynamic link parameter value and each available UE parameter value. However, the calculation of an MSD value for a UE is generally always an approximation of a "true" value in light of factors like individual UE unit differences, measurement tolerances, rounding errors, and the like, and in most cases, an approximate MSD value suffices for the purposes of this disclosure. Further, approximations omitting less critical parameter values and requiring less computational power may be more pragmatic. For example, an approximate MSD value may be calculated within a UE based on a selected subset of UE parameters (e.g., based on the lower order IMDs, for example, only orders 2, 3, and 4) and a selected subset of dynamic link parameters (e.g., just the UL/DL band combinations in use).

As another example, the IMD characteristics of a particular UE or UE design may be mathematically modeled to generate a table like TABLE 2 above, which then may be stored in a LUT within the particular UE or within each UE of the same design as UE parameter values. During operation, the current link parameter values may be used (directly or indirectly) as indices to the LUT to determine the existence of IMD for particular band combinations and optionally the order and magnitude of such IMD contribution to self-interference (desense) for a determinable UE parameter (i.e., the UL and DL bands of the UE). That pre-stored LUT information may then be provided to the communication network system as an approximation of an MSD value. The communication network system may then take appropriate action with respect to allocating or de-allocating system resources to the UE.

Referring to TABLE 2 as one variant example of this approach, a UE may determine that it is receiving within band B29 (a Victim) and transmitting two strong signals in bands n5 and B14 (the Aggressors) and provide an indication that an overlap exists or not (rather than providing a pre-stored value). If, for example, the actual Aggressor sub-band combination is n5=824-829 MHz and B14=788-793 MHz, then the UE may provide to the communication network system an indication that the UE is subject to 5th order IMD. As another example, if the actual Aggressor sub-band combination is n5=839-844 MHz and B14=788-793 MHZ, then the UE may provide to the communication network system an indication that the UE is not subject to appreciable IMD. In either example, the communication network system may take appropriate action with respect to allocating or de-allocating system resources to the UE based on the provided indicator.

Yet another example of an approximate determination of an MSD value combines the IMD value determination (such as by the above method) with a thermal noise determination for the components within a receive path of a transceiver. IMD generation may be caused outside of the receive path, while thermal noise is dependent only on the receive path.

Both arrive at the transceiver LNA output and that is the comparison point. For example, the thermal noise of the receive path may be added to the largest IMD value (e.g., the 3rd order IMD) contribution from a component for a receive path of a transceiver, or to the largest component IMD contribution (for the IMD order of concern) that travels the same receive path. The resulting sum of thermal noise and IMD contribution is an approximate MSD value for the UE.

A more precise determination of an MSD value may be made by calculating the IMD contributions attributable to an Aggressor signal through each component in an RFFE in the cascaded chain, from the Aggressor signal generation to a receiver port (i.e., the LNA output), and adding in a thermal noise determination. For example, TABLE 4 below shows the calculated IMD2 contribution from each component block with respect to a Victim signal determined for an Aggressor signal presented at each block's input. The receive path may be, for example, the receive signal path 324 through the transceiver 302*a* shown in FIG. 3. The Aggressor bands may be, for example, the output through the transmit signal path 322 in FIG. 3 and the output through the transmit signal path 326 in FIG. 3. The gain and noise figure values may be, for example, locally stored or computed UE parameter values, as described above. A per-block IP2 computation and the Aggressor signal input level (20 dBm in this example) are used to find IMD2 levels generated by each component block. The accumulated IMD2 is determined as: IMD2 of the present block+(previously accumulated IMD2×In-band Gain of the present block). TABLE 4 shows that the accumulated IMD2 through all component blocks is about-58.4 dBm in this example (the LNA 316*a* being the largest contributor). [Note that "cascaded" is used to indicate that the computation follows a common cascaded lineup analysis, and, in general, the values add fairly easily in dB; "accumulated" indicates that the computation is tracking the actual power level along the chain and adding each line item's contribution.]

TABLE 4

| Block | Inband Gain (dB) | Noise Figure (dB) | Inband IP2 (dBm) | Block IMD2 (dBm) | Accumulated IMD2 (dBm) | Cascaded Gain (dB) | Cascaded Noise Factor (dB) |
|---|---|---|---|---|---|---|---|
| Antenna 306ac | 0 | 0 | — | — | — | 0 | 0 |
| Triplexer 314ac | −1 | 1 | 114 | −140.0 | −140.0 | −1.0 | 1.0 |
| Ant. Switch 312a | −1 | 1 | 109 | −137.0 | −135.5 | −2.0 | 2.0 |
| Duplexer 310a | −1 | 1 | 114 | −202.0 | −136.5 | −3.0 | 3.0 |
| Switch 318a | −1 | 1 | 109 | −191.4 | −137.5 | −4.0 | 4.0 |
| LNA 316a | 18 | 2 | 12 | −58.4 | **−58.4** | 14.0 | 6.0 |

TABLE 5 below shows an example of a determination of Total Thermal Noise for the RFFE (at the output of the LNA) corresponding to TABLE 4, where Total Thermal Noise=kTB+10×log 10(Channel Bandwidth)+Cascaded Noise Factor+Cascaded Gain.

TABLE 5

| Thermal Noise Factors | | |
|---|---|---|
| Ambient Thermal Noise, kTB | −174.0 | dBm/Hz |
| 10log(Channel Bandwidth) @ 4.5 MHz | 66.5 | dB-Hz |
| Thermal Noise Subtotal | −107.5 | dBm |
| Cascaded Noise Factor (from TABLE 4) | 6.0 | dB |
| Cascaded Gain (from TABLE 4) | 14.0 | dB |
| Total Thermal Noise | **−87.5** | dBm |

The −58.4 dBm Accumulated IMD2 ($IMD2_{ACC}$) data from TABLE 4 (expressed as 1.45E-06 mW) and the −87.5 dBm Total Thermal Noise ($TN_{TOTAL}$) data from TABLE 5 (expressed as 1.79E-09 mW) may be combined to compute an MSD value according to the following formula and converted to dB:

$$MSD = \left((IMD2_{ACC} + TN_{TOTAL})/TN_{TOTAL}\right)$$

Accordingly, for the example data shown in TABLES 4 and 5, the computed MSD value for the example RFFE configuration and environment is 29.1 dB.

Figure 6:
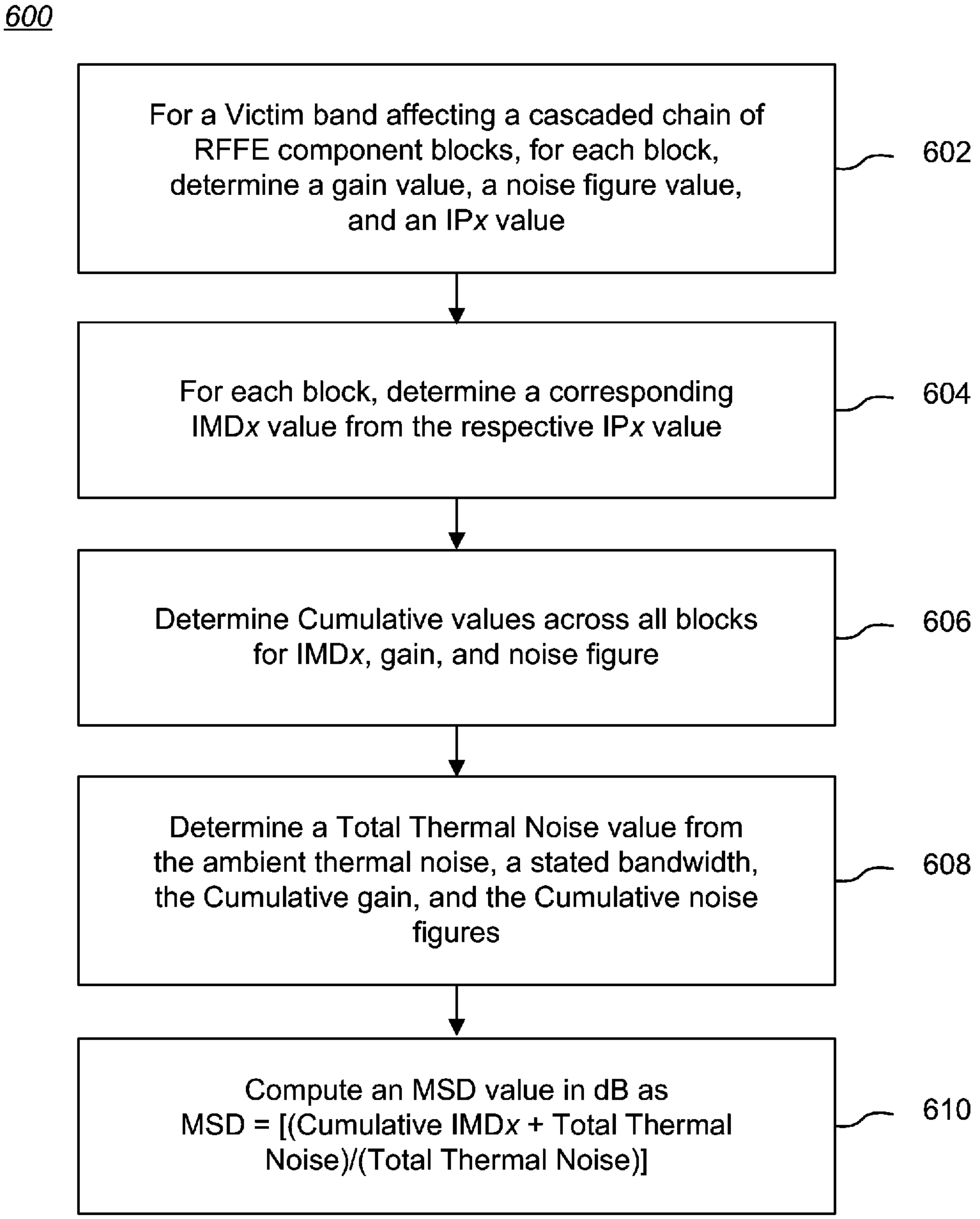
FIG. 6 is a process flow chart showing one method of determining an MSD value.

FIG. 6 is a process flow chart 600 showing one method of determining an MSD value. The method essentially uses data similar to the data in TABLES 4 and 5; essentially, the IPx and corresponding IMDx values (where x≥2) that cause an overlap are used to determine the MSD level. The method includes: for a Victim band affecting a cascaded chain of RFFE component blocks, for each block, determine a gain value, a noise figure value, and an IPx value (Block 602); for each block, determine a corresponding IMDx value from the respective IPx value (Block 604); determine Cumulative values across all blocks for IMDx, gain, and noise figure (Block 606); determine a Total Thermal Noise value from the ambient thermal noise, a stated bandwidth, the Cumulative gain, and the Cumulative noise figures (Block 608); and compute an MSD value in dB as MSD=[(Cumulative IMDx+Total Thermal Noise)/(Total Thermal Noise)](Block 610).

It should be appreciated that other determinations of an exact MSD value or an approximate MSD value may be made within a UE without departing from the scope of the present invention.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for case of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

System Aspects

Embodiments of the present invention are useful in a wide variety of RF communication systems. Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, 6G, and WiFi (e.g., 802.11a, b, g, ac, ax, be), as well as other radio communication standards and protocols.

As a person of ordinary skill in the art will understand, the system architecture and methods set forth in this disclosure enables better reception, lower power, longer battery life, and wider bandwidth. These system-level improvements are specifically enabled by the current invention.

Another benefit of embodiments of the present invention is that real-time determination (based on parameters) by a UE of its MSD value is essentially fully dynamic and "future proof", since reprograming a UE combined with on-the-fly MSD computation capability gives a UE the ability to deal with new or varying parameter sets.

Methods

Figure 7:
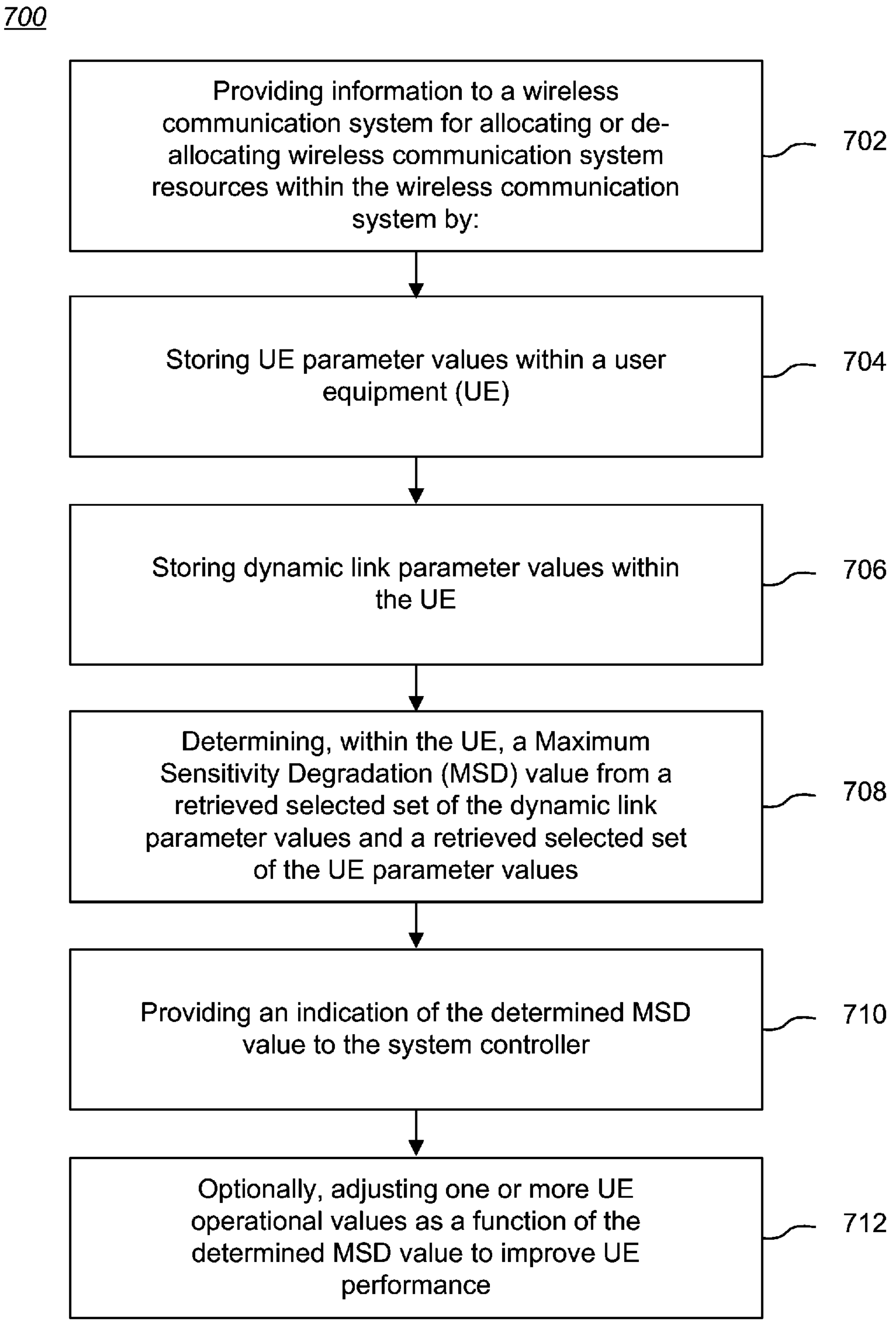
FIG. 7 is a process flow chart showing one method of providing information to a wireless communication system for allocating or de-allocating wireless communication system resources within the wireless communication system.

Another aspect of the invention includes methods optimizing allocation or de-allocation of wireless communication system resources within a wireless communication system. For example, FIG. 7 is a process flow chart 700 showing one method of providing information to a wireless communication system for allocating or de-allocating wireless communication system resources within the wireless communication system (Block 702). The method includes: storing UE parameter values within a user equipment (UE) (Block 704); storing dynamic link parameter values within the UE (Block 706); determining, within the UE, a Maximum Sensitivity Degradation (MSD) value from a retrieved selected set of the dynamic link parameter values and a retrieved selected set of the UE parameter values (Block 708); and providing an indication of the determined MSD value to the system controller (Block 710). The method may also include adjusting one or more UE operational values as a function of the determined MSD value to improve UE performance (Block 712).

Additional aspects of the above method may include one or more of the following: wherein the dynamic link parameters include one or more allocated band combinations allocated by the system controller to the UE, or a channel bandwidth, or sub-carrier spacing, or resource block allocations, or transmit and receive frequency bands, or uplink and downlink combinations, or at least one modulation coding scheme; wherein the dynamic link parameters are stored within a look-up table within the UE; wherein the UE parameters include one or more measures of non-linear behavior for a radio frequency front end (RFFE) of the UE, or one or more measures of rejection levels for a RFFE of the UE, or one or more measures of noise levels for a RFFE of the UE; wherein the UE parameters are stored within a look-up table within the UE; determining the MSD value periodically; determining the MSD value upon occurrence of a specified event, or of a programmatic command, or of a sensed state transition, or of a detected change within the UE, or of a specified transmission or reception event; wherein the indication of the determined MSD value is the computed MSD value or is the result of comparing the computed MSD value to a static MSD reference value; wherein the MSD value is determined as a function of the sum of thermal noise and interference within the UE; wherein the MSD value is determined as a function of the sum of thermal noise and intermodulation distortion within the UE; wherein determining the MSD value includes, for a Victim band affecting a cascaded chain of radio frequency component blocks within the UE, for each block, determining a gain value, a noise figure value, and an IPx value, where $x \geq 2$, for each block, determining a corresponding IMDx value, where $x \geq 2$, from the respective IPx value, determining Cumulative values across all blocks for IMDx, gain, and noise, determining a Total Thermal Noise value from the ambient thermal noise, a stated bandwidth, the Cumulative gain, and the Cumulative noise figures, and computing the MSD value in dB as MSD=[(Cumulative IMDx+Total Thermal Noise)/(Total Thermal Noise)]; applying the determined MSD value to adjust a parameter of a radio frequency component block within the UE; applying the determined MSD value to adjust a channel bandwidth of a radio frequency component block within the UE; applying the determined MSD value to adjust a bias voltage to a radio frequency amplifier within the UE; and/or applying the determined MSD value to adjust a bias current to a radio frequency amplifier within the UE.

Fabrication Technologies & Options

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Programmable Embodiments

Some or all aspects of the invention, particularly the determination of MSD values for a UE, may be implemented in hardware or software, or a combination of both (e.g., programmable logic arrays). Unless otherwise specified, the algorithms included as part of the invention are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, embodiments of the invention may be implemented in one or more computer programs (i.e., a set of instructions or codes) executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program instructions or code may be applied to input data to perform the functions described in this disclosure and generate output information. The output information may be applied to one or more output devices in known fashion.

Each such computer program may be implemented in any desired computer language (including machine, assembly, or high-level procedural, logical, or object-oriented programming languages) to communicate with a computer system, and may be implemented in a distributed manner in which different parts of the computation specified by the software are performed by different computers or processors. In any case, the computer language may be a compiled or interpreted language. Computer programs implementing some or all of the invention may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory media or devices, or magnetic or optical media) for a period of time (e.g., the time between refresh periods of a dynamic memory device, such as a dynamic RAM, or semi-permanently or permanently), the storage media or device being readable by a general or special purpose programmable computer or processor for configuring and operating the computer or processor when the storage media or device is read by the computer or processor to perform the procedures described above. The inventive system may also be considered to be implemented as a non-transitory computer-readable storage medium, configured with a computer program, where the storage medium so configured causes a computer or processor to operate in a specific or predefined manner to perform the functions described in this disclosure.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A wireless communication system including:

(a) a system controller configured to allocate or de-allocate wireless communication system resources to plurality of user equipment (UE); and (b) at least one UE of the plurality of UEs configured to autonomously determine a Maximum Sensitivity Degradation (MSD) value from a selected set of dynamic link parameter values and a selected set of UE parameter values, and provide an indication of the determined MSD value to the system controller;

wherein the system controller allocates or de-allocates wireless communication system resources to the at least one UE based on the provided indication of the determined MSD value.

2. The invention of claim 1, wherein the dynamic link parameters include one or more allocated band combinations allocated by the system controller to the at least one UE.

3. The invention of claim 1, wherein the dynamic link parameters include a channel bandwidth.

4. The invention of claim 1, wherein the dynamic link parameters include sub-carrier spacing.

5. The invention of claim 1, wherein the dynamic link parameters include resource block allocations.

6. The invention of claim 1, wherein the dynamic link parameters include transmit and receive frequency bands.

7. The invention of claim 1, wherein the dynamic link parameters include uplink and downlink combinations.

8. The invention of claim 1, wherein the dynamic link parameters include at least one modulation coding scheme.

9. The invention of claim 1, wherein the UE parameters include one or more measures of non-linear behavior for a radio frequency front end of the UE.

10. The invention of claim 1, wherein the UE parameters include one or more measures of rejection levels for a radio frequency front end of the UE.

11. The invention of claim 1, wherein the UE parameters include one or more measures of noise levels for a radio frequency front end of the UE.

12. The invention of claim 1, wherein the UE parameters include one or more measures of thermal noise and interference within the UE.

13. The invention of claim 1, wherein the MSD value is determined periodically.

14. The invention of claim 1, wherein determination of the MSD value is triggered by occurrence of a specified event.

15. The invention of claim 1, wherein the indication of the determined MSD value is the computed MSD value.

16. The invention of claim 1, wherein the indication of the determined MSD value is the result of comparing the computed MSD value to a static MSD reference value.

17. The invention of claim 1, wherein the MSD value is determined as a function of the sum of thermal noise and interference within the UE.

18. The invention of claim 1, wherein the UE includes computational processor configured to determine the MSD value by performing the functions of:

(a) for a Victim band affecting a cascaded chain of radio frequency component blocks within the UE, for each block, determine a gain value, a noise figure value, and an IPx value, where x≥2;

(b) for each block, determine a corresponding IMDx value, where x≥2, from the respective IPx value;

(c) determine Cumulative values across all blocks for IMDx, gain, and noise;

(d) determine a Total Thermal Noise value from the ambient thermal noise, a stated bandwidth, the Cumulative gain, and the Cumulative noise figures; and (e) compute the MSD value in dB as MSD=[(Cumulative IMDx+Total Thermal Noise)/(Total Thermal Noise)].

19. The invention of claim 1, wherein the UE includes a computational processor configured to determine the MSD value and apply the determined MSD value to adjust a parameter of a radio frequency component block within the UE.

20. The invention of claim 1, wherein the UE includes a computational processor configured to determine the MSD value and apply the determined MSD value to adjust a filter response of a radio frequency component block within the UE.

* * * * *